Patented July 28, 1925.

1,547,845

UNITED STATES PATENT OFFICE.

GASTON D. THÉVENOT, OF NEW YORK, N. Y., ASSIGNOR TO THE DEVELOPMENT & RESEARCH LABORATORIES, INC., A CORPORATION OF NEW YORK.

METHOD FOR THE MANUFACTURE OF SACCHARINE PRODUCTS.

No Drawing.  Application filed March 19, 1921. Serial No. 453,732.

*To all whom it may concern:*

Be it known that I, GASTON D. THÉVENOT, a citizen of the United States, residing at No. 327 West 75th Street, New York, N. Y., have invented certain new and useful Improvements in Methods for the Manufacture of Saccharine Products, of which the following is a clear, full, and exact description.

My invention relates to a process of manufacturing saccharine products particularly from a starchy mass such as corn, and my object is to improve upon the methods heretofore used.

In the so-called wet milling process heretofore carried out, the whole corn is soaked for a sufficient length of time in water containing a small quantity of sulphurous acid or sulphites to facilitate soaking and avoid decay. When the corn is properly softened, it is crushed in specially constructed mills in such a way as thoroughly to crush the meal body or endosperm containing the starch, forming a paste-like mass, while the germs and husks are left as much as possible uncrushed. In other words the object of this wet milling process is mainly to bring the corn into a condition in which the germ and husks can be relatively easily separated from the starch.

After this wet milling, water is added in such a quantity as to obtain a starchy liquor of sufficient buoyancy to carry the husks and germs to the surface, whence the latter are removed by flotation or skimming. The starchy liquor is either used for the manufacture of dry starch or is converted into saccharine products by boiling it under pressure with the addition of mineral acid, for example, hydrochloric acid. A long period of boiling, or a high pressure or both, result in products containing a large amount of sugars, mainly dextrose, and little dextrin, while short boiling and low pressures have the opposite effect.

The husks and germs previously separated as explained before, are utilized for the manufacture of corn oil in which the germs are particularly rich. The oil is usually removed by pressure.

The remaining cake is used as a cattle feed.

According to the so-called dry-milling process less generally employed in the manufacture of saccharine products, the whole corn is ground dry, i. e., without previous soaking. Special mills are used in which the corn is broken into relatively large pieces, while husks and germs are broken off, the latter being removed during the grinding process by suction or blowing. The remaining starch-carrying meal body is reground and may subsequently be used for the manufacture of saccharine products in the same manner as the starch made by the wet-milling process. The germs are used in the manufacture of oil.

In both the aforementioned methods there is a serious loss of starch and in the dry process furthermore a loss of oil.

In the wet process it is impossible to effect an absolutely complete separation of the starch from either husks or germs; on the contrary, a considerable amount of starch will always be carried away either with the liquid adhering to the germs in which finely divided starch is suspended or in portions of the endosperm which were not separated from the husks or germs during grinding. The oil, however, may be recovered almost entirely as it is contained practically exclusively in the germs.

In the dry process a similar loss of starch occurs, due to portions of the meal body still clinging to the germs and husks when these are removed by a current of air, and through sucking or blowing very small and consequently light particles of the endosperm with the germs. At the same time the germs are not left entirely intact during the preliminary grinding, small particles are broken off and these remain mixed with the broken and subsequently ground endosperm. As these particles of germ contain an appreciable amount of oil, it is evident that in the dry-milling process a considerable percentage of oil is lost.

One object of my invention is to obtain a greater yield than heretofore possible, by avoiding the loss of starch as well as loss of oil. In carrying out my process as I at present prefer, corn is soaked and ground, with the use of sulphurous acid to facilitate soaking and avoid decay, as in the wet-milling process. In that process the husks and germs are floated or skimmed off and the starch is liquefied and saccharified by the addition of acid. In my process I preferably do not remove the husks and germs, but I lead the ground mass, including the husks and germs as well as the starchy material, with a sufficiently large quantity of water, for example, five parts by weight of water to one part of dry matter, into a suitable receptacle, and then add a small percentage of malt, say, three to five per cent and by weight of the corn, preferably a high diastatic malt being used. With continuous stirring, the total mass is gradually heated to about 167° F. and held at about that temperature until (except for the husks and germs) completely liquefied by the action of the malt thereon. The liquefied mass is then heated to the boiling point and boiled for ten to thirty minutes, preferably under pressure.

A small amount, for example, one-half of one per cent by weight of the total solids of mineral acid such as hydrochloric acid is then added and the mass boiled under pressure until the required degree of hydrolysis has been obtained, i. e., when the product contains the desired proportion of sugars to dextrins.

After blowing off the pressure, the liquid containing the products of starch hydrolysis in solution, and the husks and germs in suspension, is run out of the receptacle and the husks and germs are separated from the liquid portion by any known means such as filtration or otherwise. The liquid portion is made into the finished marketable product by concentration, decolorization and filtration, while the husks and germs are deprived of their oil by well known methods. I find that if I do not liquefy with malt and boil before the addition of the saccharifying substance, I do not obtain as good results, for incomplete saccharification and poor filtration ensues. I believe this is because some of the albumen will be dissolved by the water and some by the acid. By the foregoing method I may produce a product containing dextrins and sugars among which latter dextrose predominates, without any substantial loss of starch and consequent loss of sugar and without loss of oil as the germs are separated completely from the liquor.

I am aware that various modifications of the procedure above pointed out may be made without departing from the spirit of my invention, and I therefore do not desire to be limited to the particular operations or steps above pointed out.

What I claim is—

1. A process of producing a saccharine product which comprises treating a starchy mass with malt, heating the resulting mass to liquefy the starch portion thereof, thereafter adding a saccharifying mineral acid thereto to complete the saccharification, and finally separating the saccharine product.

2. A process of producing a saccharine product which comprises treating a starchy mass with malt at a suitable temperature to liquefy the starch portion of the said mass, thereafter adding a saccharifying acid substance thereto at a suitable temperature to produce saccharification, and finally separating the desired saccharine product from the said mass.

3. A process of producing a saccharine product which comprises treating a starchy mass containing water with a small percentage of malt, heating the resulting mass to about 167° F. while agitating the mass, whereby the starch portion thereof is liquefied, thereafter heating the mass to the boiling point and boiling for about ten to thirty minutes, then adding a mineral acid, reboiling the mass, and finally separating out the product desired.

Signed at New York, N. Y., this 17th day of March, 1921.

GASTON D. THÉVENOT.